United States Patent
Jia (10) Patent No.: US 11,568,667 B2
(45) Date of Patent: Jan. 31, 2023

(54) DISPLAY VERIFICATION METHOD AND APPARATUS FOR BROWSER

(71) Applicant: BEIJING BAIDU NETCOM SCIENCE AND TECHNOLOGY CO., LTD., Beijing (CN)

(72) Inventor: Zheng Jia, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 19 days.

(21) Appl. No.: 17/306,422

(22) Filed: May 3, 2021

(65) Prior Publication Data

US 2021/0256199 A1 Aug. 19, 2021

(30) Foreign Application Priority Data

Sep. 28, 2020 (CN) .......................... 202011045400.6

(51) Int. Cl.
*G06F 17/00* (2019.01)
*G06V 30/418* (2022.01)
(Continued)

(52) U.S. Cl.
CPC ........ *G06V 30/418* (2022.01); *G06F 16/9577* (2019.01); *G06K 9/6215* (2013.01); *H04L 67/02* (2013.01)

(58) Field of Classification Search
CPC ... G06F 40/12; G06F 16/9577; G06V 30/418; G06K 9/6215; G06T 17/05
See application file for complete search history.

(56) References Cited

U.S. PATENT DOCUMENTS

| 7,584,423 B2 * | 9/2009 | Rohrabaugh | ........... G06F 9/451 715/234 |
| 2005/0132286 A1 * | 6/2005 | Rohrabaugh | ........... H04L 67/04 715/239 |

(Continued)

FOREIGN PATENT DOCUMENTS

| JP | 2000082039 A | 3/2000 |
| JP | 2005190443 A | 7/2005 |

(Continued)

OTHER PUBLICATIONS

Wang, Shengjin, et al, "Adaptive Data Transmission Browsing of Scanned Documents Using JPEG2000", Procedings of the IEEE Workshop on Knowledge Media Networking (KMN'02), pp. 78-83, Jan. 1, 2002. (Year: 2002).*

(Continued)

*Primary Examiner* — Laurie A Ries
(74) *Attorney, Agent, or Firm* — Osha Bergman Watanabe & Burton LLP (57) ABSTRACT

The present disclosure discloses display verification method and apparatus for a browser, the method includes: providing the browser with image drawing data matching with a browser request page; in which the browser locally draws a display image included in the browser request page after the image drawing data is provided to the browser; acquiring a browser drawing image corresponding to the image drawing data; and performing display verification on the browser according to the browser drawing image and a standard drawing image matching with the image drawing data.

15 Claims, 5 Drawing Sheets

(51) Int. Cl.
   *G06K 9/62*      (2022.01)
   *H04L 67/02*     (2022.01)
   *G06F 16/957*    (2019.01)

(56) References Cited

U.S. PATENT DOCUMENTS

| | | | | |
|---|---|---|---|---|
| 2007/0283244 | A1* | 12/2007 | Hays | G06F 16/9577 |
| | | | | 715/210 |
| 2009/0265616 | A1* | 10/2009 | Kyu | G09G 5/34 |
| | | | | 715/247 |
| 2010/0083146 | A1* | 4/2010 | Hasuike | G06T 11/40 |
| | | | | 715/856 |
| 2013/0287305 | A1 | 10/2013 | Dhanda et al. | |
| 2014/0105491 | A1* | 4/2014 | Hayek | G06V 10/751 |
| | | | | 382/221 |
| 2014/0189497 | A1* | 7/2014 | Cahill | G06F 40/143 |
| | | | | 715/234 |
| 2015/0188977 | A1* | 7/2015 | Berry | G06T 7/0002 |
| | | | | 709/217 |
| 2016/0065216 | A1* | 3/2016 | Thiagarajan | H03K 19/0005 |
| | | | | 326/38 |
| 2016/0177810 | A1* | 6/2016 | Gullberg | F04D 29/162 |
| | | | | 415/173.3 |
| 2018/0107758 | A1* | 4/2018 | Ha | G06F 16/9577 |
| 2018/0114088 | A1* | 4/2018 | Tanaka | G06F 16/9577 |
| 2018/0173686 | A1* | 6/2018 | Kwon | G06F 40/143 |
| 2021/0256199 | A1* | 8/2021 | Jia | H04L 67/02 |

FOREIGN PATENT DOCUMENTS

| | | | | |
|---|---|---|---|---|
| WO | WO-2012042561 A1 * | 4/2012 | | G06F 11/3438 |
| WO | 2016065216 A2 | 4/2016 | | |

OTHER PUBLICATIONS

Extended European Search Report issued in corresponding EP Application No. 21171218.7 dated Oct. 21, 2021 (8 pages).
Murdoch, Graham "Base Web—Visual Regression Testing", Dec. 16, 2019, XP055850169, Retrieved from the Internet: <URL:https://baseweb.design/blog/visual-regression-testing/> (17 pages).
Office Action issued in Japanese Application No. 2021-133660, dated Oct. 18, 2022 (11 pages).

* cited by examiner

DISPLAY VERIFICATION METHOD AND APPARATUS FOR BROWSER

CROSS-REFERENCE TO RELATED APPLICATION

The present application is based upon and claims priority to Chinese Patent Application No. 202011045400.6, filed on Sep. 28, 2020, the entirety contents of which are incorporated herein by reference.

TECHNICAL FIELD

The present disclosure relates to a field of image processing, specifically but not limited to, the field of cloud computing, and in particular to a display verification method and apparatus for a browser.

BACKGROUND

Web maps are used for interactive display of geographic information. Web maps are usually drawn by Web map engines through three-dimensional rendering technology WebGL (Web Graphics Library). However, the correctness of the Web maps that are drawn and displayed in the browser could not be verified.

SUMMARY

Embodiments of the present disclosure provide a display verification method and apparatus for a browser.

Embodiment of the present disclosure discloses a display verification method for a browser, which includes: providing the browser with image drawing data matching with a browser request page; in which, the browser locally draws a display image included in the browser request page after the image drawing data is provided to the browser; acquiring a browser drawing image corresponding to the image drawing data; and performing display verification on the browser according to the browser drawing image and a standard drawing image matching with the image drawing data.

Embodiment of the present disclosure discloses a display verification method for a browser, which includes: detecting in real time whether the browser has completed a local drawing for image drawing data provided by a server; and controlling the browser to obtain a browser drawing image corresponding to the image drawing data in response to the browser having completed the local drawing for the image drawing data, and sending the browser drawing image to the server.

Embodiment of the present disclosure discloses a display verification apparatus for a browser, which includes: one or more processors; a memory storing instructions executable by the one or more processors; in which the one or more processors are configured to: provide the browser with image drawing data matching with a browser request page; in which, the browser locally draws a display image included in the browser request page after the image drawing data is provided to the browser; acquire a browser drawing image corresponding to the image drawing data; and perform display verification on the browser according to the browser drawing image and a standard drawing image matching with the image drawing data.

It should be understood that the content described in this section is not intended to identify key or important features of the embodiments of the present disclosure, nor is it intended to limit the scope of the present disclosure. Additional features of the present disclosure will be easily understood through the following description.

BRIEF DESCRIPTION OF THE DRAWINGS

The accompanying drawings are used to better understand the solution, and do not constitute a limitation on the present disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

In the prior art, the correctness of the interface parameters is usually verified through automate testing at the interface level for the Web map engine. However, due to the different browsers, systems, graphics cards, and graphics drivers accessed by the user, the correctness of the Web map that is drawn and displayed in the browser cannot be verified only through the interface test.

Embodiment 1

Figure 1:
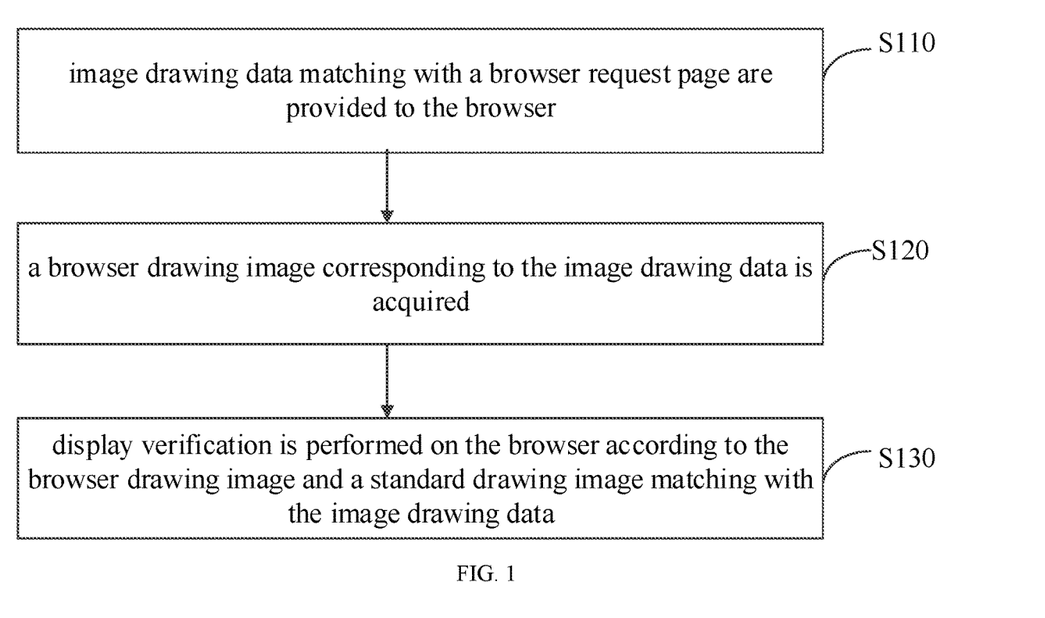
FIG. 1 is a flow chart of a display verification method for a browser provided by Embodiment 1 of the present disclosure.

FIG. 1 is a flow chart of a display verification method for a browser provided by Embodiment 1 of the present disclosure. The technical solution of the embodiment of the present disclosure may be applicable to the case of verifying the correctness of the map image drawn locally by the browser. The method can be implemented by a display verification apparatus for a browser, which can be implemented by software and/or hardware, and is generally integrated in a server to be used in conjunction with a browser.

As shown in FIG. 1, the technical solution of the embodiment of the present disclosure specifically includes the following steps.

At step S110, image drawing data matching with a browser request page are provided to the browser.

The browser locally draws a display image included in the browser request page after the image drawing data is provided to the browser.

The browser request page is a page displayed to the user after the user enters a web address. Optionally, the browser request page may be a map display page, that is, a page containing a map image as a display image. Correspondingly, the image drawing data may be map image drawing data.

After the browser receives the image drawing data, the local image rendering service is invoked, and the display image may be drawn according to the image drawing data. After the browser locally draws the display image according to the image drawing data, the correctness of the display image cannot be guaranteed, that is, it is not sure whether the browser displays normally. Therefore, embodiments of the present disclosure perform display verification on the browser.

At step S120, a browser drawing image corresponding to the image drawing data is acquired.

The browser drawing image is used to compare with the standard drawing image drawn by the server and matched with the image drawing data, so as to determine whether the local image rendering service of the browser is normal, that is, whether the browser has display abnormality. The browser drawing image may be a complete display image drawn locally by the browser according to the image drawing data, or an image obtained by intercepting the display image at a random position, or an image obtained by intercepting the display image at a fixed position.

The browser drawing image may be actively reported by the browser to the server after completing the drawing of the display image, or requested and acquired from the browser after the server receiving a drawing completion instruction sent by the browser, or acquired directly from the drawing canvas and providing directly to the server or providing to the server via the browser by invoking the system's own canvas image interface after the built-in code of the browser request page detecting that the browser completes the drawing of the display image, which will not be limited in the embodiments of the present disclosure.

At step S130, display verification is performed on the browser according to the browser drawing image and a standard drawing image matching with the image drawing data.

In the embodiments of the present disclosure, the browser drawing image and the standard drawing image are respectively the images drawn locally by the browser and drawn by the server corresponding to the same display content. Therefore, when the browser drawing image is quite different from the standard drawing image, it can be determined that the browser has a display abnormality.

With the technical solution of the embodiment of the present disclosure, by providing image drawing data to the browser, the browser is enabled to perform local drawing according to the image drawing data to obtain the display image in the browser request page, the browser drawing image drawn by the browser may be obtained, and the browser drawing image is compared with the standard drawing image, so as to perform the display verification on the browser. The problem in the prior art that the correctness of the map image drawn and displayed by the browser cannot be verified is solved, and the correctness of the map drawn and displayed by the browser is verified, thereby ensuring the correctness of the map rendering result.

Optionally, acquiring a browser drawing image corresponding to the image drawing data includes: receiving the browser drawing image triggered and sent in response to the browser running the browser request page.

A canvas image interface is triggered and invoked in the browser after it is detected in the browser request page that the browser completes a local drawing for the image drawing data, so as to control the browser to acquire and send the browser drawing image.

The browser request page contains a section of executable program code, and the program code is executed when the browser loads the browser request page. When the program code is running, it detects whether the browser has completed the local drawing of the image drawing data. If the drawing of the display image is completed, the browser is controlled to obtain the browser drawing image according to the display image, and the browser drawing image is sent to server.

The canvas image interface is used to crop the image, and obtain the corresponding screenshot according to the location information of the screenshot area. The canvas image interface can be used to intercept the displayed image and obtain the browser drawing image.

Further, acquiring the browser drawing image corresponding to the image drawing data includes: acquiring a browser drawing image matching with the map image drawing data, a map coordinate range and a map level matching with the browser drawing image; and before performing the display verification on the browser according to the browser drawing image and the standard drawing image matching with the image drawing data, the method further includes: acquiring map drawing data according to the map coordinate range and the map level matching with the browser drawing image; and performing the server drawing according to the map drawing data to obtain the standard drawing image.

The map coordinate range is the geographic information corresponding to the browser drawing image, and the map level is the layer level of the browser drawing image, which reflects the scale of the browser drawing image, that is, a degree to which the distance on the graph is reduced from the actual distance. The map drawing data can include the size of the browser drawing image, the map coordinate range and the map level that match with the browser drawing image. The map drawing data is used to enable the server draw the standard drawing image with the same geographic location, size, and layer level corresponding to the browser drawing image. The standard drawing image is the image obtained by the server according to the map drawing data by invoking the underlying rendering service.

In the embodiments of the present disclosure, while the browser feeds back the browser drawing image to the server, the map coordinate range and map level matching with the browser drawing image is fed back to the server. The server constructs the map drawing data according to the browser drawing image, the map coordinate range and the map level, and then performs server drawing based on the map drawing data to obtain the standard drawing image, which is used to compare with the browser drawing image to determine whether the browser has display abnormality.

Embodiment 2

Figure 2:
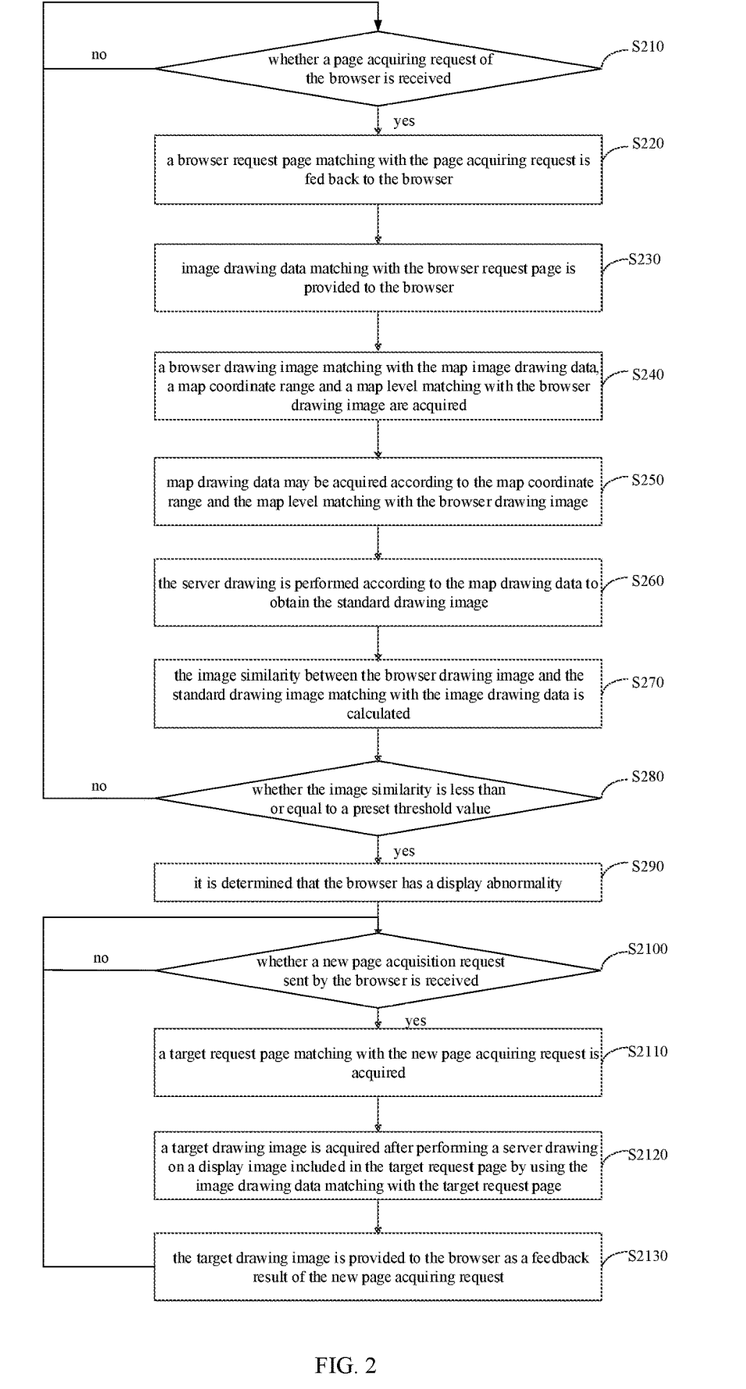
FIG. 2 is a flow chart of a display verification method for a browser provided by Embodiment 2 of the present disclosure.

FIG. 2 is a flow chart of a display verification method for a browser provided by Embodiment 2 of the present disclosure. On the basis of the above-mentioned embodiment, this embodiment describes in detail the process of acquiring the browser drawing image, and the process of performing the browser display verification according to the browser drawing image and the standard drawing image, and the steps of feeding back the browser request page to the browser and the processing process when the browser displays an abnormality have been added.

Correspondingly, as shown in FIG. 2, the technical solution of the embodiment of the present disclosure specifically includes the following steps.

At step S210, it is determined whether a page acquiring request of the browser is received, if yes, execute S220, otherwise, execute S210. In the process from obtaining the URL input by the user to displaying the browser request page, the browser first needs to send a page acquiring request to the server. After receiving the page acquiring request from the browser, the server feeds back the browser request page to the browser, so that the browser can load the browser request page.

Optionally, a piece of executable program code can be added to the browser request page. The function of the executable program code is to start execution when the browser loads the browser request page, and to send an image drawing data acquiring request in the browser, and to detect the local drawing status of the image of the browser in the process of the browser performing the local drawing according to the image drawing data. When it is detected that the local drawing of the display image is completed, the browser is controlled to intercept the browser drawing image according to the display image and to send the browser drawing image to the server.

At step S220, a browser request page matching with the page acquiring request is fed back to the browser.

At step S230, image drawing data matching with the browser request page is provided to the browser.

After the browser obtains the browser request page, during the running process of the browser request page, it sends an image drawing data acquisition request to the server, and the server feeds back the image drawing data matching with the browser request page to the browser.

The browser request page is a map display page, and the image drawing data is map image drawing data.

At step S240, a browser drawing image matching with the map image drawing data, a map coordinate range and a map level matching with the browser drawing image are acquired.

At step S250, map drawing data may be acquired according to the map coordinate range and the map level matching with the browser drawing image.

At step S260: the server drawing is performed according to the map drawing data to obtain the standard drawing image.

At step S270, the image similarity between the browser drawing image and the standard drawing image matching with the image drawing data is calculated.

In embodiments of the present disclosure, the browser drawing image and the standard drawing image are compared and the image similarity is calculated. When the image similarity is greater than the threshold, it means that the browser drawing image is not much different from the standard drawing image, and the local rendering service of the browser is running normally, and the browser display is normal. However, when the image similarity is less than or equal to the threshold, it means that the browser drawing image is quite different from the standard drawing image, and the browser has display abnormalities.

At step S280, it is determined whether the image similarity is less than or equal to a preset threshold value, if yes, execute S290, otherwise, execute S210.

At step S290, it is determined that the browser has a display abnormality.

At step S2100, it is determined whether a new page acquisition request sent by the browser is received, if yes, execute S2110, otherwise, return to execute S2100.

The new page acquiring request is a new page acquiring request sent by the browser to the server after confirming that the browser has a display abnormality.

In the embodiment of the present disclosure, when it has been confirmed that the browser has a display abnormality, it is not suitable for the browser to invoke the local image rendering service to continue local rendering, and server rendering can be performed on the display image in the new browser request page. Therefore, real-time detection of new page acquiring request is required.

At step S2110, a target request page matching with the new page acquiring request is acquired.

The target request page is the page that matches the new page acquiring request. When the browser loads the target request page, because it has been determined that the browser has a display abnormality, if it continues to draw locally based on the image drawing data, the wrong drawing result will be obtained. Therefore, it is necessary for the server to draw and obtain the display image included in the target request page.

At step S2120, a target drawing image is acquired after performing a server drawing on a display image included in the target request page by using the image drawing data matching with the target request page.

At step S2130, the target drawing image is provided to the browser as a feedback result of the new page acquiring request. The step S2100 is performed.

In the embodiment of this disclosure, since it is confirmed that the browser has a display abnormality, it is not suitable for the browser to invoke the local image rendering service, and continue to locally draw the display image contained in the target request page corresponding to the new page acquiring request, the server may invoke the underlying rendering service to perform the server drawing, and the correct target drawing image is obtained, so that the target drawing image is fed back to the browser and displayed on the target request page, thereby ensuring the correctness of the map rendering result.

It should be noted that the steps S2100-S2130 merely describe a processing manner after confirming that the browser has display abnormality. It can also prompt the user to upgrade the browser version or the graphics card driver by popping up a prompt window in the browser, and the user can solve the problem of browser display abnormality as soon as possible, thereby ensuring the correctness of the browser's map rendering results from another dimension.

The technical solution of the embodiments of the present disclosure provide a browser request page and image drawing data to the browser, and receive the browser drawing image generated and sent according to the image drawing data when the browser is running the browser request page. The map drawing data matching the browser drawing image is drawn by the server to generate a standard drawing image. When the similarity between the browser drawing image and the standard drawing image is less than or equal to the threshold, the server will receive the new page acquiring request afterwards according to the new request page. The corresponding image drawing data is drawn by the server, and the target drawing image drawn by the server is directly fed back to the browser for display.

The problem in the prior art that the correctness of the map image drawn and displayed by the browser cannot be verified is solved, and the correctness verification of the map drawn and displayed by the browser is realized, and the server will directly perform the map rendering when the browser displays abnormally, thereby ensuring the correctness of the map rendering results.

Embodiment 3

Figure 3:
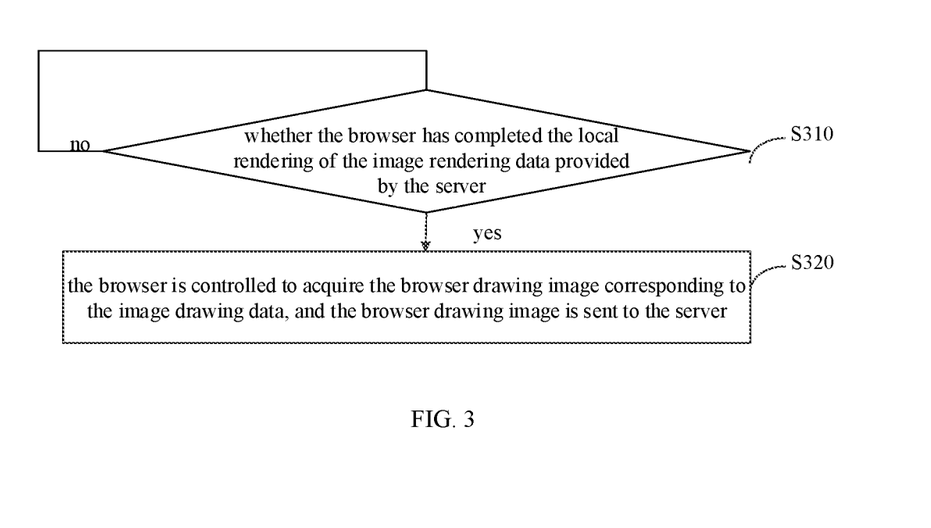
FIG. 3 is a flow chart of a display verification method for a browser provided by Embodiment 3 of the present disclosure.

FIG. 3 is a flow chart of a display verification method for a browser provided by Embodiment 3 of the present disclosure. The technical solution of the embodiment of the present disclosure can be adapted to provide the browser drawing image drawn locally by the browser to the server for correctness verification. This method can be implemented by a display verification apparatus for a browser, which can be implemented by software and/or hardware, and is generally integrated in a server to be used in conjunction with a browser.

At step S310, it is determined whether the browser has completed the local rendering of the image rendering data provided by the server, if yes, execute S320, otherwise return to execute S310.

The image drawing data may be map image drawing data.

In the embodiment of the present disclosure, the method is executed by a section of executable program code contained in the browser request page sent by the server to the browser. During the execution of the program code, if it is detected that the browser has completed the local drawing of the image drawing data, the browser is controlled to intercept the display image obtained by the local drawing to obtain the browser drawing image, and the browser drawing image is sent to the server.

At step S320, the browser is controlled to acquire the browser drawing image corresponding to the image drawing data, and the browser drawing image is sent to the server.

Optionally, controlling the browser to obtain the browser drawing image corresponding to the image drawing data in response to the browser having completed the local drawing for the image drawing data, and sending the browser drawing image to the server, includes: triggering and invoking a canvas image interface in the browser, and controlling the browser to acquire the browser drawing image corresponding to the image drawing data; and controlling the browser to send the browser drawing image to the server.

In the embodiment of the present disclosure, the display image can be intercepted through the canvas image interface, and the browser drawing image can be obtained.

The technical solution of the embodiment of the present disclosure detects the state of the browser locally drawing the image according to the image drawing data sent by the server in real time, and when the local drawing is completed, the browser drawing image is provided to the server for correctness verification of the browser drawing image. The problem in the prior art that the correctness of the map image drawn and displayed by the browser cannot be verified is solved, and the browser drawing image is provided to the server, so that the server performs the correctness verification on the map image drawn and displayed by the browser, thereby ensuring the correctness of the map rendering results.

Embodiment 4

Figure 4:
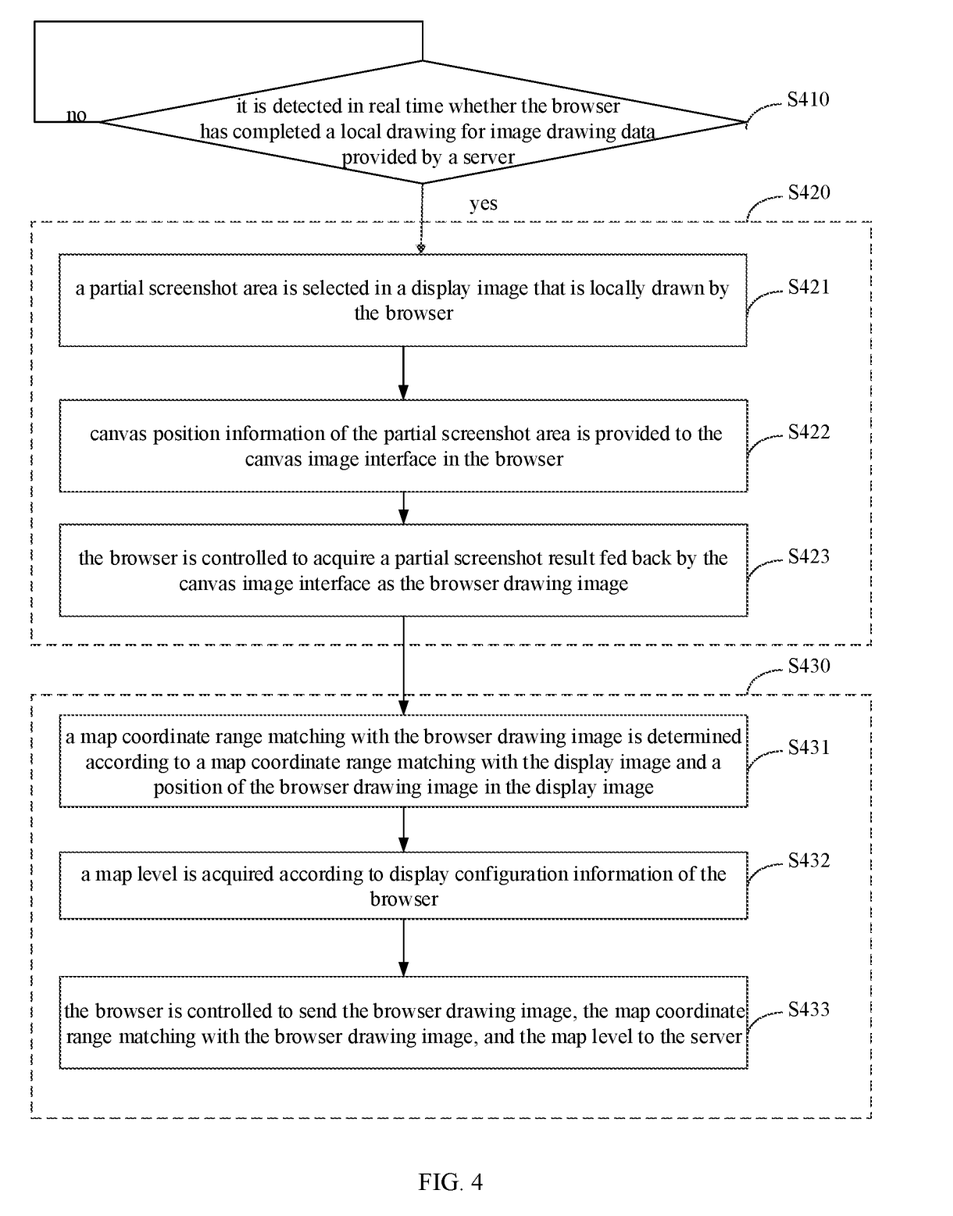
FIG. 4 is a flow chart of a display verification method for a browser provided by Embodiment 4 of the present disclosure.

FIG. 4 is a flow chart of a display verification method for a browser provided by Embodiment 4 of the present disclosure. On the basis of the above-mentioned embodiment, this embodiment describes in detail the process of acquiring the browser drawing image according to the image drawing data and the process of sending the browser drawing image to the server.

Correspondingly, as shown in FIG. 4, the technical solution of the embodiment of the present disclosure specifically includes the following steps.

At step S410, it is detected in real time whether the browser has completed a local drawing for image drawing data provided by a server, if yes, execute S420, otherwise return to execute S410.

At step S420, a canvas image interface is triggered and invoked in the browser, and the browser is controlled to acquire the browser drawing image corresponding to the image drawing data.

Correspondingly, the step S420 may include followings.

At step S421, a partial screenshot area is selected in a display image that is locally drawn by the browser.

The partial screenshot area may be randomly selected, or the canvas position information of the partial screenshot area may be preset, which is not limited in this embodiment.

At step S422, canvas position information of the partial screenshot area is provided to the canvas image interface in the browser.

The canvas position information is the position coordinate range of the partial screenshot area in the display image. The canvas image interface intercepts the displayed image according to the canvas position information of the partial screenshot area, and the obtained partial screenshot result is the browser drawing image.

At step S423, the browser is controlled to acquire a partial screenshot result fed back by the canvas image interface as the browser drawing image.

At step S430, the browser is controlled to send the browser drawing image to the server.

Correspondingly, the step S430 can include the followings.

At step S431, a map coordinate range matching with the browser drawing image is determined according to a map coordinate range matching with the display image and a position of the browser drawing image in the display image.

The browser drawing image is obtained by intercepting the display image. Therefore, a map coordinate range matching with the browser drawing image is determined according to a map coordinate range matching with the display image and a position of the browser drawing image in the display image.

At step S432, a map level is acquired according to display configuration information of the browser.

The map level is the basic configuration information of the displayed image, which can be understood as the size correspondence between the screen pixels and the actual distance, which can be obtained through the display configuration information of the browser.

At step S433, the browser is controlled to send the browser drawing image, the map coordinate range matching with the browser drawing image, and the map level to the server.

The browser sends the browser drawing image, the map coordinate range, and the map level to the server, so that the server draws the standard drawing image based on the above data, and then performs the display verification on the browser according to the compassion between the standard drawing image and the browser drawing image.

In the embodiment of the present disclosure, after the browser requests a browser request page containing the display image from the server, the server first returns the browser request page to the browser. The browser request page contains a piece of executable program codes, and the codes are executed when the browser loads the browser request page. During the execution of the executable program codes, the browser sends an image drawing data acquiring request to the server, and the server provides the browser with image drawing data matching with the browser request page. When the browser receives the image drawing data, it performs local drawing according to the image drawing data to generate a display image. When the executable program code detects that the browser generates a display image, the browser is controlled to take a screenshot of the browser drawing image through the canvas image interface, and feeds the browser drawing image and map drawing data back to the server, and the server performs server drawing based on the map drawing data, generates a standard drawing image, and compares the browser drawing image with the standard drawing image to determine whether the browser display is abnormal.

The technical solution of the embodiment of the present disclosure detects the state of the browser locally drawing the image according to the image drawing data sent by the server in real time. When the local drawing is completed, the canvas image interface is invoked in the browser to take a screenshot of the browser drawing image, and obtain the map coordinate range and map level of the browser drawing image, the browser drawing image, the map coordinate range and the map level are provided to the server to verify the correctness of the browser drawing image. The problem in the prior art that the correctness of the map image drawn and displayed by the browser cannot be verified is solved, and the browser drawing image is provided to the server, such that the correctness of the map image drawn and displayed by the browser is verified, thereby ensuring the correctness of the map rendering result.

Embodiment 5

Figure 5:
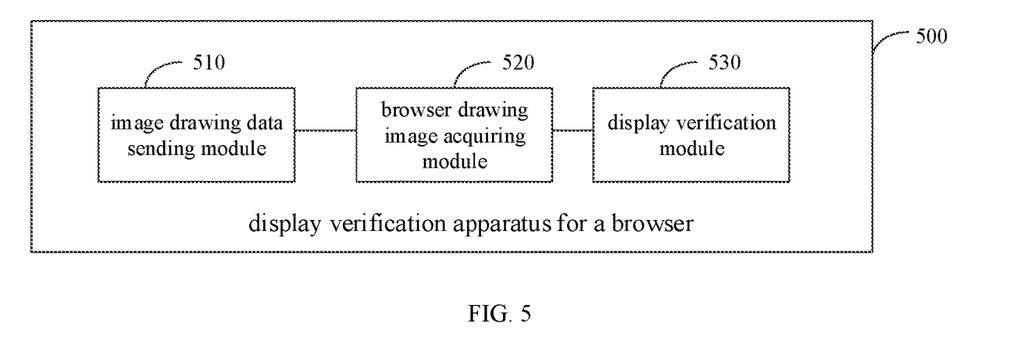
FIG. 5 is a structure diagram of a display verification apparatus for a browser provided by Embodiment 5 of the present disclosure.

FIG. 5 is a structure diagram of a display verification apparatus for a browser provided by Embodiment 5 of the present disclosure. The apparatus may be implemented by software and/or hardware, and is generally integrated in a server and used in conjunction with a browser. The apparatus 500 includes: an image drawing data sending module 510, a browser drawing image acquiring module 520, and a display verification module 530.

The image drawing data sending module 510 is configured to provide the browser with image drawing data matching with a browser request page.

The browser locally draws a display image included in the browser request page after the image drawing data is provided to the browser.

The browser drawing image acquiring module 520 is configured to acquire a browser drawing image corresponding to the image drawing data.

The display verification module 530 is configured to perform display verification on the browser according to the browser drawing image and a standard drawing image matching with the image drawing data.

With the technical solution of the embodiment of the present disclosure, by providing image drawing data to the browser, the browser is enabled to perform local drawing according to the image drawing data to obtain the display image in the browser request page, the browser drawing image drawn by the browser may be obtained, and the browser drawing image is compared with the standard drawing image, so as to perform the display verification on the browser. The problem in the prior art that the correctness of the map image drawn and displayed by the browser cannot be verified is solved, and the correctness of the map drawn and displayed by the browser is verified, thereby ensuring the correctness of the map rendering result.

On the basis of the foregoing embodiment, the apparatus 500 further includes: a browser request page feedback module, which is configured to feed back a browser request page matching with the page acquiring request to the browser in response to a page acquiring request of the browser.

The browser drawing image acquiring module 520 includes: a browser drawing image receiving unit, which is configured to receive the browser drawing image triggered and sent in response to the browser running the browser request page.

A canvas image interface is triggered and invoked in the browser after it is detected in the browser request page that the browser completes a local drawing for the image drawing data, so as to control the browser to acquire and send the browser drawing image.

On the basis of the foregoing embodiment, the display verification module 530 includes: an image similarity calculation unit, which configured to calculate an image similarity between the browser drawing image and the standard drawing image matching with the image drawing data; a display abnormality determining unit, which is configured to determine the browser having a display abnormality in response to the image similarity smaller than or equal to a preset threshold.

On the basis of the foregoing embodiment, the apparatus 500 further includes: a target request page acquiring module, which is configured to, in response to the browser having a display abnormality, acquire a target request page matching with a new page acquiring request when receiving the new page acquiring request sent by the browser; a target drawing image acquiring module, which is configured to acquire a target drawing image after performing a server drawing on a display image included in the target request page by using the image drawing data matching with the target request page; and a feedback result sending module, which is configured to provide the target drawing image to the browser as a feedback result of the new page acquiring request.

On the basis of the foregoing embodiment, the browser request page is a map display page, and the image drawing data is map image drawing data.

On the basis of the foregoing embodiment, the browser drawing image acquiring module 520 includes: a data acquiring unit, configured to acquire a browser drawing image matching with the map image drawing data, a map coordinate range and a map level matching with the browser drawing image.

The apparatus further includes: a map drawing data acquiring module, which is configured to acquire map drawing data according to the map coordinate range and the map level matching with the browser drawing image; and a standard drawing image acquiring module, which is configured to perform the server drawing according to the map drawing data to obtain the standard drawing image.

The display verification apparatus for a browser provided in the embodiments of the present disclosure can execute the display verification method for a browser provided in any embodiment of the present disclosure, and has the corresponding functional modules and beneficial effects of the execution method.

Embodiment 6

Figure 6:
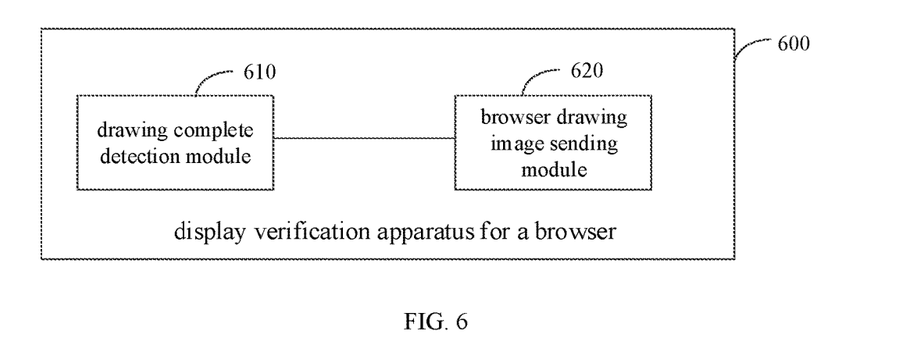
FIG. 6 is a structure diagram of a display verification apparatus for a browser provided by Embodiment 6 of the present disclosure.

FIG. 6 is a structure diagram of a display verification apparatus for a browser provided by Embodiment 6 of the present disclosure. The apparatus can be implemented by software and/or hardware, and is generally integrated in a browser and used in conjunction with a server.

The apparatus 600 includes: a drawing complete detection module 610 and a browser drawing image sending module 620.

The drawing complete detection module 610 is configured to detect in real time whether the browser has completed a local drawing for image drawing data provided by a server.

The browser drawing image sending module 620 is configured to control the browser to obtain a browser drawing image corresponding to the image drawing data in response to the browser having completed the local drawing for the image drawing data, and to send the browser drawing image to the server.

The technical solution of the embodiment of the present disclosure detects the state of the browser locally drawing the image according to the image drawing data sent by the server in real time, and when the local drawing is completed, the browser drawing image is provided to the server for correctness verification of the browser drawing image. The problem in the prior art that the correctness of the map image drawn and displayed by the browser cannot be verified is solved, and the browser drawing image is provided to the server, so that the server performs the correctness verification on the map image drawn and displayed by the browser, thereby ensuring the correctness of the map rendering results.

On the basis of the foregoing embodiment, the browser drawing image sending module 620 includes: a canvas image interface invoking unit, which is configured to trigger and invoke a canvas image interface in the browser, and controlling the browser to acquire the browser drawing image corresponding to the image drawing data; and a browser drawing image sending unit, configured to control the browser to send the browser drawing image to the server.

On the basis of the foregoing embodiment, the image drawing data is map image drawing data.

On the basis of the foregoing embodiment, the canvas image interface invoking unit is configured to: select a partial screenshot area in a display image that is locally drawn by the browser; provide canvas position information of the partial screenshot area to the canvas image interface in the browser; and control the browser to acquire a partial screenshot result fed back by the canvas image interface as the browser drawing image.

On the basis of the foregoing embodiment, the browser drawing image sending unit is configured to: determine a map coordinate range matching with the browser drawing image according to a map coordinate range matching with the display image and a position of the browser drawing image in the display image; acquire a map level according to display configuration information of the browser; control the browser to send the browser drawing image, the map coordinate range matching with the browser drawing image, and the map level to the server.

The display verification apparatus for a browser provided in the embodiment of the present disclosure can execute the display verification method for a browser provided in any embodiment of the present disclosure, and has functional modules and beneficial effects corresponding to the execution method.

Embodiment 7

According to the embodiments of the present disclosure, the present disclosure also provides an electronic device and a readable storage medium.

Figure 7:
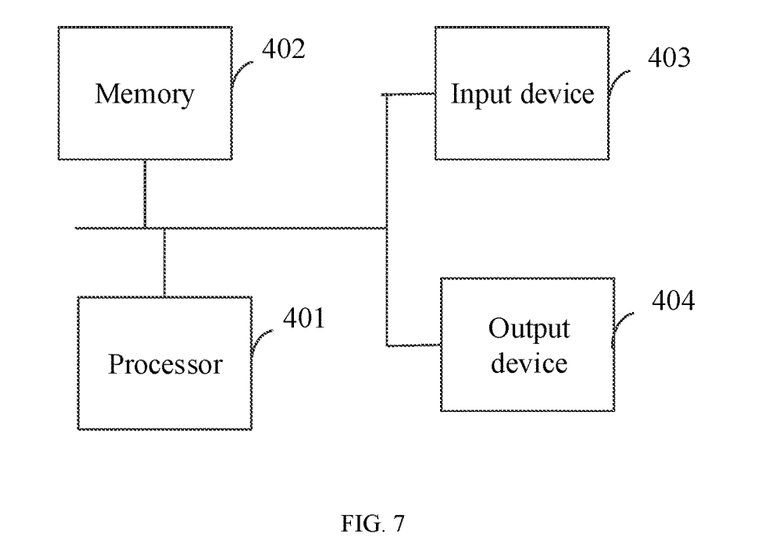
FIG. 7 is a structure diagram of an electronic device provided by Embodiment 7 of the present disclosure.

As shown in FIG. 7, FIG. 7 is a structure diagram of an electronic device provided by Embodiment 7 of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the electronic device includes: one or more processors 401, a memory 402, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 401 is taken as an example in FIG. 7.

The memory 402 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 402 is configured to store non-transitory software programs, non-transitory computer executable programs and modules, such as program instructions/modules (for example, the image drawing data sending module 510, the browser drawing image acquiring module 520, and the display verification module 530 shown in FIG. 5, or the drawing complete detection module 610 and the browser drawing image sending module 620 shown in FIG. 6) corresponding to the method in the embodiment of the present disclosure. The processor 401 executes various functional disclosures and data processing of the server by running non-transitory software programs, instructions, and modules stored in the memory 402, that is, implementing the method in the foregoing method embodiments.

The memory 402 may include a storage program area and a storage data area, where the storage program area may store an operating system and disclosure programs required for at least one function. The storage data area may store data created according to the use of the electronic device for implementing the method. In addition, the memory 402 may include a high-speed random access memory, and a non-transitory memory, such as at least one magnetic disk storage device, a flash memory device, or other non-transitory solid-state storage device. In some embodiments, the memory 402 may optionally include a memory remotely disposed with respect to the processor 401, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 403 and an output device 404. The processor 401, the memory 402, the input device 403, and the output device 404 may be connected through a bus or in other manners. In FIG. 7, the connection through the bus is taken as an example.

The input device 403 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 404 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, disclosure specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software disclosures, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an disclosure server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this disclosure shall be included in the protection scope of this disclosure.

What is claimed is:

1. A display verification method for a browser, comprising:
   providing the browser with image drawing data matching with a browser request page;
   wherein, the browser locally draws a display image included in the browser request page after the image drawing data is provided to the browser;
   acquiring a browser drawing image corresponding to the image drawing data; and
   performing display verification on the browser according to the browser drawing image and a standard drawing image matching with the image drawing data,
   wherein after performing the display verification on the browser, the method further comprises:
   in response to the browser having a display abnormality, acquiring a target request page matching with a new page acquiring request when receiving the new page acquiring request sent by the browser;
   acquiring a target drawing image after performing a server drawing on a display image included in the target request page by using the image drawing data matching with the target request page; and
   providing the target drawing image to the browser as a feedback result of the new page acquiring request.

2. The method according to claim 1, before providing the browser with image drawing data matching with the browser request page, further comprising:

in response to a page acquiring request of the browser, feeding back a browser request page matching with the page acquiring request to the browser;

wherein, acquiring a browser drawing image corresponding to the image drawing data comprises:

receiving the browser drawing image triggered and sent in response to the browser running the browser request page;

wherein, a canvas image interface is triggered and invoked in the browser after it is detected in the browser request page that the browser completes a local drawing for the image drawing data, so as to control the browser to acquire and send the browser drawing image.

3. The method according to claim 2, wherein performing display verification on the browser according to the browser drawing image and the standard drawing image matching with the image drawing data comprises:

calculating an image similarity between the browser drawing image and the standard drawing image matching with the image drawing data;

determining the browser having a display abnormality in response to the image similarity smaller than or equal to a preset threshold.

4. The method according to claim 1, wherein the browser request page is a map display page, and the image drawing data is map image drawing data.

5. The method according to claim 4, wherein acquiring the browser drawing image corresponding to the image drawing data comprises:

acquiring a browser drawing image matching with the map image drawing data, a map coordinate range and a map level matching with the browser drawing image; and before performing the display verification on the browser according to the browser drawing image and the standard drawing image matching with the image drawing data, the method further includes:

acquiring map drawing data according to the map coordinate range and the map level matching with the browser drawing image; and performing the server drawing according to the map drawing data to obtain the standard drawing image.

6. A display verification method for a browser, comprising:

detecting in real time whether the browser has completed a local drawing for image drawing data provided by a server;

controlling the browser to obtain a browser drawing image corresponding to the image drawing data in response to the browser having completed the local drawing for the image drawing data, and sending the browser drawing image to the server, wherein the method further comprises:

in response to the browser having a display abnormality, sending a new page acquisition request to the server, to allow the server to acquire a target request page matching with the new page acquiring request and acquire a target drawing image after performing a server drawing on a display image included in the target request page by using the image drawing data matching with the target request page; and receiving the target drawing image from the server.

7. The method according to claim 6, wherein controlling the browser to obtain the browser drawing image corresponding to the image drawing data in response to the browser having completed the local drawing for the image drawing data, and sending the browser drawing image to the server, comprise:

triggering and invoking a canvas image interface in the browser, and controlling the browser to acquire the browser drawing image corresponding to the image drawing data; and controlling the browser to send the browser drawing image to the server.

8. The method according to claim 7, wherein the image drawing data is map image drawing data.

9. The method according to claim 8, wherein triggering and invoking the canvas image interface in the browser, and controlling the browser to acquire the browser drawing image corresponding to the image drawing data, comprise:

selecting a partial screenshot area in a display image that is locally drawn by the browser;

providing canvas position information of the partial screenshot area to the canvas image interface in the browser; and controlling the browser to acquire a partial screenshot result fed back by the canvas image interface as the browser drawing image.

10. The method according to claim 9, wherein controlling the browser to send the browser drawing image to the server comprises:

determining a map coordinate range matching with the browser drawing image according to a map coordinate range matching with the display image and a position of the browser drawing image in the display image;

acquiring a map level according to display configuration information of the browser;

controlling the browser to send the browser drawing image, the map coordinate range matching with the browser drawing image, and the map level to the server.

11. A display verification apparatus for a browser, comprising:

one or more processors; a memory storing instructions executable by the one or more processors; wherein the one or more processors are configured to:

provide the browser with image drawing data matching with a browser request page;

wherein, the browser locally draws a display image included in the browser request page after the image drawing data is provided to the browser;

acquire a browser drawing image corresponding to the image drawing data; and perform display verification on the browser according to the browser drawing image and a standard drawing image matching with the image drawing data, wherein the one or more processors are further configured to:

in response to the browser having a display abnormality, acquire a target request page matching with a new page acquiring request when receiving the new page acquiring request sent by the browser;

acquire a target drawing image after performing a server drawing on a display image included in the target request page by using the image drawing data matching with the target request page; and provide the target drawing image to the browser as a feedback result of the new page acquiring request.

12. The apparatus according to claim 11, wherein the one or more processors are configured to:

in response to a page acquiring request of the browser, feed back a browser request page matching with the page acquiring request to the browser;

receive the browser drawing image triggered and sent in response to the browser running the browser request page;

wherein, a canvas image interface is triggered and invoked in the browser after it is detected in the browser request page that the browser completes a local drawing for the image drawing data, so as to control the browser to acquire and send the browser drawing image.

13. The apparatus according to claim 12, wherein the one or more processors are configured to:

calculate an image similarity between the browser drawing image and the standard drawing image matching with the image drawing data;

determine the browser having a display abnormality in response to the image similarity smaller than or equal to a preset threshold.

14. The apparatus according to claim 11, wherein the browser request page is a map display page, and the image drawing data is map image drawing data.

15. The apparatus according to claim 14, wherein the one or more processors are configured to:

acquire a browser drawing image matching with the map image drawing data, a map coordinate range and a map level matching with the browser drawing image; and acquire map drawing data according to the map coordinate range and the map level matching with the browser drawing image; and perform the server drawing according to the map drawing data to obtain the standard drawing image.

* * * * *